(12) United States Patent
Kitamura et al.

(10) Patent No.: US 7,684,138 B2
(45) Date of Patent: Mar. 23, 2010

(54) MAGNETIC DISK DRIVE, METHOD FOR REGISTERING DEFECTIVE SECTOR, AND METHOD FOR CONTROLLING FLYING HEIGHT

(75) Inventors: Nobuhito Kitamura, Kanagawa (JP); Hitoshi Yoshida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 577 days.

(21) Appl. No.: 11/607,821

(22) Filed: Nov. 30, 2006

(65) Prior Publication Data
US 2007/0146920 A1 Jun. 28, 2007

(30) Foreign Application Priority Data
Dec. 1, 2005 (JP) ............................. 2005-347558

(51) Int. Cl.
*G11B 5/09* (2006.01)
(52) U.S. Cl. .............................. 360/51; 360/53; 360/31; 360/75
(58) Field of Classification Search ........................ None
See application file for complete search history.

(56) References Cited

U.S. PATENT DOCUMENTS

| | | | | |
|---|---|---|---|---|
| 4,777,544 A | * | 10/1988 | Brown et al. ................... | 360/75 |
| 5,121,057 A | * | 6/1992 | Huber et al. ................. | 324/212 |
| 5,247,254 A | * | 9/1993 | Huber et al. ................. | 324/212 |
| 5,825,577 A | * | 10/1998 | Miyatake et al. ............... | 360/75 |
| 6,008,640 A | * | 12/1999 | Tan et al. ..................... | 324/212 |
| 6,381,710 B1 | * | 4/2002 | Kim ............................ | 714/45 |
| 2005/0046982 A1 | * | 3/2005 | Liu et al. ....................... | 360/31 |

FOREIGN PATENT DOCUMENTS

| | | |
|---|---|---|
| JP | 09-045009 | 2/1997 |
| JP | 11-066709 | 8/1997 |
| JP | 09-251727 | 9/1997 |
| JP | 10-233070 | 9/1998 |

* cited by examiner

*Primary Examiner*—Jason C Olson
(74) *Attorney, Agent, or Firm*—Townsend and Townsend and Crew LLP; Patrick Duncan (57) ABSTRACT

Embodiments in accordance with the present invention relate to detecting a micro-relief that exists on surfaces of a magnetic disk. A phase or frequency of a read signal obtained when data written to a minute projection or a minute concavity on a recording surface of a magnetic disk is read out, differs from that of a read signal obtained when data written to a flat recording surface is read out. The phase progresses in the minute projection, whereas the phase is delayed in the minute concavity. A micro-relief is detected by measuring a deviation value of this frequency, and then defect registration is performed. Embodiments in accordance with the present invention are configured to detect a minute projection whose level does not cause TA. Embodiments in accordance with the present invention may also be configured to provide a highly reliable magnetic disk drive by controlling the flying height in response to a state of a minute projection and that of a minute concavity.

20 Claims, 6 Drawing Sheets

| ABA |
|---|
| 000 |
| 11C |
| 352 |
| 5B9 |
| F01 |
| FFA |

Fig. 6(a)

| LBA of defective sector | LBA of alternate sector |
|---|---|
| 555 | F00 |
| 564 | F01 |
| 5E7 | F02 |
| 6DA | F03 |
| 7A3 | F04 |
| 7B9 | F05 |

Fig. 6(b)

| LBA | The amount of operation |
|---|---|
| 001 | +010 |
| 11D | +030 |
| 353 | −008 |
| 5BA | −015 |
| F02 | +018 |
| FFB | −021 |

Fig. 6(c)

MAGNETIC DISK DRIVE, METHOD FOR REGISTERING DEFECTIVE SECTOR, AND METHOD FOR CONTROLLING FLYING HEIGHT

CROSS-REFERENCE TO RELATED APPLICATION

The instant nonprovisional patent application claims priority to Japanese Patent Application No. 2005-347558, filed Dec. 1, 2005 and incorporated by reference in its entirety herein for all purposes.

BACKGROUND OF THE INVENTION

The present invention relates to a technology for detecting a micro-relief such as a minute projection and a minute concavity, which exist on recording surfaces of a magnetic disk, and more particularly to a technology for detecting a micro-relief on the basis of a deviation value of a frequency or phase of a read signal.

A magnetic head of a magnetic disk drive flies over a magnetic disk so as to write or read data with an extremely slight gap being kept between the magnetic head and a magnetic layer of the magnetic disk. The gap between the magnetic head and the magnetic layer is called "flying height". In order to increase the recording density, it is necessary to make the flying height as low as possible, and also to keep the flying height constant. For this purpose, it is desirable that surfaces of the magnetic disk be flat. However, because time and cost constraints are placed on a manufacturing process, it is difficult to make the surfaces of the magnetic disk completely flat as a surface finish. In actuality, a minute projection and a minute concavity inevitably remain.

In recent years, the flying height is reduced to about 10 nm, and accordingly an influence of a micro-relief exerted on write or read operation becomes larger. If a read head is a GMR head or a MR head, which uses a GMR (giant magnetoresistive effect) element or an MR (magnetoresistive effect) element respectively, data cannot be read when a collision of the read head with a minute projection causes the temperature of the GMR element or the MR element to increase, which is, what is called, a phenomenon of thermal asperity (hereinafter referred to as TA). On the minute concavity, the flying height substantially increases, and accordingly a degree of magnetic coupling between the magnetic head and the magnetic layer becomes weak. As a result, sufficient magnetization cannot be achieved.

In addition, a protective layer for preventing corrosion is formed on a surface of a magnetic head element. If the magnetic head collides with a minute projection on a surface of the magnetic disk, which causes the protective layer to be worn away, the magnetic head element becomes more subject to corrosion. Moreover, if a lubricating protective layer on the surface of the magnetic disk comes off as a result of the collision of the magnetic head with the minute projection, there is a case where the height of the minute projection increases, or a case where a fragment of the lubricating protective layer which has come off adheres to another part of the magnetic disk, and consequently a new minute projection is formed.

Japanese Patent Application Laid-Open No. Hei 9-251727 (Patent document 1) describes that when a MR head collides with a surface of a magnetic disk, a signal waveform whose signal amplitude (output level) suddenly fluctuates occurs in a read signal. Japanese Patent Application Laid-Open No. Hei 11-66709 (Patent document 2) discloses a technology in which before shipment of a magnetic disk drive, a MR head is caused to collide with a minute projection so as to detect the occurrence of TA, and then defect registration of sectors relating to a position of the projection is performed. Japanese Patent Application Laid-Open No. Hei 9-45009 (Patent document 3) discloses a PLL circuit for, even if an abnormal read signal caused by a defect of a disk is inputted, preventing an oscillation frequency of a synchronization pulse signal from greatly deviating from a specified value. The PLL circuit includes: a phase-locked loop circuit for detecting a phase error between a read signal and a synchronization pulse signal during data read operation, and for executing phase synchronization operation of the synchronization pulse signal so that this phase error is corrected; and a frequency pulling loop circuit for executing frequency pulling operation so that a frequency error with the synchronization pulse signal is corrected.

Japanese Patent Application Laid-Open No. Hei 10-233070 (Patent document 4) discloses a technology for directly detecting, by use of a gap detecting circuit, fluctuations in gap between a magnetic disk and a magnetic head as fluctuations in DC potential by amplifying a signal from the magnetic head using an amplifier, which is directly connected, without passing the signal through a coupling capacitor. In addition, according to the patent document 4, it is possible to keep the magnetic spacing constant by controlling the height of the magnetic head, more specifically, by controlling a gap between the magnetic disk and the magnetic head using a gap control circuit, so that the DC potential equivalent to the detected gap is kept at a constant value.

Heretofore, the MR head is actually caused to contact a minute projection so that TA occurs, and thereby the minute projection on a surface of a magnetic disk is detected before shipment. By use of this method, it is possible to detect a minute projection whose height is high enough to contact the MR head. However, after the use of a magnetic disk drive is started, there is a possibility that a minute projection whose height is not high enough to cause TA before shipment will become a kernel, and then particles generated as a result of the head/slider's contacting a surface of the magnetic disk, particles remaining inside, and the like, will gradually adhere to the kernel so that the kernel grows up to the size which will cause TA.

If the MR head collides with a minute projection after user data is written to a data sector, and consequently TA occurs, user data cannot be read out from the data sector. In addition, there is a possibility that a fragment which has come off from the surface of the magnetic disk as a result of the collision will adhere to another part of the magnetic disk, and will then become a kernel of a new minute projection. Moreover, there is also a possibility that the magnetic head will be damaged. Therefore, in order to avoid a collision, it is desirable that even if a minute projection before shipment is not so large that causes TA, such a minute projection be detected and eliminated. Additionally, after the shipment, it is desirable to avoid a collision of the magnetic head with a minute projection as much as possible.

Furthermore, in the past, even if a data sector contains a minute concavity, if the data sector passes a write/read test before shipment, the data sector was used just as it is. Since the flying height substantially increases on a minute concavity, in order to perform stable write and read operation, it is desirable disallow the use of the data sector beforehand if the depth thereof is greater than or equal to a specified value.

However, in the case of the conventional magnetic disk drives, it was difficult to detect a minute concavity, and a minute projection whose height is not high enough to cause TA. In addition, there was no effective method for, after the shipment of the magnetic disk drive, and after user data has been written, avoiding a situation in which a minute projection grows up, which eventually causes TA.

Embodiments in accordance with the present invention have been made to solve the above problems, and an object of embodiments of the present invention is to provide a magnetic disk drive that is capable of detecting a micro-relief formed on a surface of a magnetic disk. Another object of embodiments in accordance with the present invention is to provide a magnetic disk drive that is capable of detecting a micro-relief to perform stable read and write operation. Still another object of embodiments in accordance with the present invention is to provide a method for registering a defective sector, and for controlling the flying height, by measuring a deviation value of a frequency or phase to detect a micro-relief in a magnetic disk drive.

BRIEF SUMMARY OF THE INVENTION

Embodiments in accordance with the present invention relate to detecting a micro-relief that exists on surfaces of a magnetic disk. As indicated in the embodiment shown in FIGS. 1(A)-(B), a phase or frequency of a read signal obtained when data written to a minute projection 19 or a minute concavity 20 on a recording surface 10a of a magnetic disk is read out, differs from that of a read signal obtained when data written to a flat recording surface is read out. The phase progresses in the minute projection, whereas the phase is delayed in the minute concavity. A micro-relief is detected by measuring a deviation value of this frequency, and then defect registration is performed. According to an embodiment of the present invention, it is possible to detect a minute projection whose level does not cause TA. In addition, certain embodiments in accordance with the present invention may be configured to provide a highly reliable magnetic disk drive by controlling the flying height in response to a state of a minute projection and that of a minute concavity.

DETAILED DESCRIPTION OF THE INVENTION

Principles of embodiments in accordance with the present invention relate to detecting a defective sector by using a deviation value of a read signal, which is equivalent to a deviation in frequency or phase of the read signal from that of a reference signal, the read signal being obtained by reading out data written to a minute projection and a minute concavity that exist on a surface of a magnetic disk. According to one embodiment of the present invention, a technology is provided for registering a defective sector by measuring a deviation value of a read signal relative to a reference signal. The deviation value is measured for both or either of a frequency and phase of the read signal. When a head/slider flies with the flying height of a write head being kept constant, the flying height substantially decreases on a minute projection. Accordingly, a frequency of a write signal written to the minute projection becomes higher than that of a write signal on a flat surface. On the other hand, the flying height substantially increases on a minute concavity. Accordingly, a frequency of a write signal written to the minute concavity becomes lower than that of a write signal on the flat surface. In other words, a phase of the write signal on the minute projection progresses as compared with that on the flat surface, whereas a phase of the write signal on the minute concavity is delayed as compared with that on the flat surface.

Even if a minute projection does not cause TA at this point of time, there is a possibility that the minute projection will cause TA in future. On the other hand, there is a possibility that a minute concavity will become an obstacle to stable read and write operation. In the present invention, therefore, a data sector containing a minute projection and/or a minute concavity is registered in an address table, and is then managed therein. Before shipment, the address table can be used as a primary defect map (PDM) for skipping a logical block address. After shipment, the address table can be used as a reassign defect map (RDM) for assigning a logical block address to an alternate sector. According to embodiments of the present invention, by registering a minute projection in the PDM, it is possible to avoid a situation in which after data is written, the minute projection grows up, causing TA, and consequently the data is lost. In addition, by registering a minute projection in the RDM, and then by disallowing the use of a data sector where there is a possibility that TA occurs, it is possible to prevent written data from being lost.

Moreover, according to embodiments of the present invention, even if a magnetic head is not contact with a magnetic disk, a deviation value of a frequency and that of a phase can be measured. Therefore, it is possible to prevent the magnetic head from being damaged as a result of a contact of the magnetic head with a minute projection, and to prevent a surface of the magnetic disk from coming off. However, from the viewpoint of the scope of embodiments in accordance with the present invention, there may be a case where the magnetic head contacts the magnetic disk while a deviation value is measured. Data sectors other than a data sector that is registered because of a deviation value are also registered in the PDM and the RDM. According to embodiments of the present invention, the address table can also be configured as a dedicated control table for storing only data sectors that are registered because of a deviation value. By using the control table, it becomes possible to easily control the flying height and a write current for a data sector containing a micro-relief.

A deviation value may be measured when a read clock gets out of synchronization with a read signal, or may also be measured while the read clock is kept in synchronization with the read signal. For the purpose of measuring a deviation value, a plurality of clocks of a read signal are grouped in order of the occurrence, and then a representing value, such as an average value and a median, relating to a frequency and phase of each clock included in each group, are compared with a reference signal. This makes it possible to make a judgment more correctly.

According to another embodiment of the invention, a magnetic disk drive is provided which is capable of controlling the flying height and a write current on the basis of a measured deviation value so as to achieve stable read and write operation. The deviation value is measured while the read clock is kept in synchronization with the read signal to perform normal read operation. In addition, even when the read head is not in contact with the magnetic disk, it is possible to detect a micro-relief on the basis of the deviation value. When a deviation value of a frequency is judged, if a frequency of a read signal is higher than that of a reference frequency, this shows that a minute projection exists. On the other hand, if the frequency of the read signal is lower than that of the reference frequency, this shows that a minute concavity exists. Moreover, an absolute value of the deviation value indicates the height of the minute projection or the depth of the minute concavity.

Accordingly, a flying-height control mechanism, which is included in the magnetic disk drive, can use a deviation value to perform such control that even on a minute projection and a minute concavity, a value of the flying height becomes the same as that on a flat surface. The flying-height control mechanism can be configured to include a Peltier device and a heater that are formed on a head/slider. In addition, the flying-height control mechanism may also be configured to include a suspension assembly, and a piezoelectric element for changing the posture of the head/slider. If an address of a data sector whose deviation value exceeds a specified value is registered in an address table, it is possible to control the flying height on a data sector whose address is known, which facilitates the control.

A frequency of a write clock can be used as the reference signal. In addition, a representing value, such as an average value and a median, obtained from read signals of a plurality of data sectors can be selected as the reference signal. An embodiment of a method for detecting a minute projection and a minute concavity according to the present invention can also be applied to magnetic disk drives that adopt a perpendicular magnetic recording system. Moreover, the magnetic disk drive according to an embodiment of the present invention can detect a minute projection and a minute concavity when the read head is not in contact with the magnetic disk. In particular, because the magnetic disk drive according to an embodiment of the present invention can detect a minute projection before TA occurs, and thereby can prevent TA from occurring before it occurs, if the read head is a MR head or a GMR head, the magnetic disk drive is particularly effective.

According to an embodiment of the present invention, a magnetic disk drive capable of detecting a micro-relief formed on a surface of a magnetic disk could be provided. Moreover, according to an embodiment of the present invention, a magnetic disk drive capable of detecting a micro-relief so as to perform stable read and write operation could be provided. Furthermore, according to an embodiment of the present invention, a method for registering a defective sector, and for controlling the flying height, by measuring a deviation value of a frequency or phase to detect a micro-relief in a magnetic disk drive, could be provided.

Figure 1A:
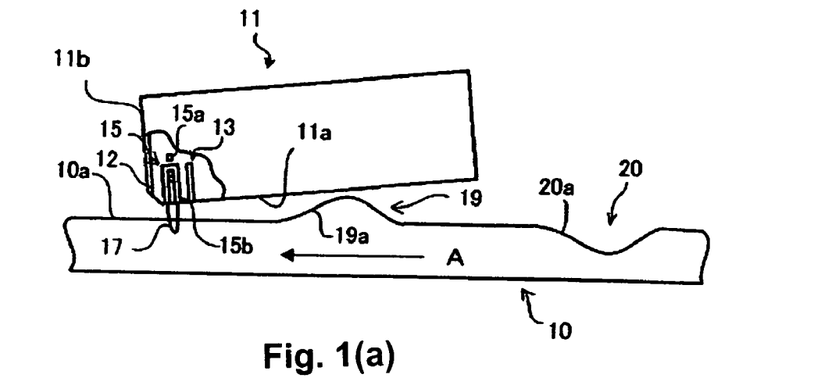
FIGS. 1(A), 1(B) are diagrams each illustrating principles of detecting a minute projection and a minute concavity according to an embodiment of the present invention.

FIG. 1(A) is a side view illustrating a state in which a head/slider 11 flies over a recording surface 10a of a magnetic disk 10 rotating in an arrow A direction. The magnetic disk 10 is an in-plane magnetic recording medium in which a magnetic layer is formed. However, embodiments in accordance with the present invention can also be applied to a perpendicular magnetic recording medium. An air bearing surface 11a of the head/slider 11 flies with a slight gap being kept between the air bearing surface 11a and the recording surface 10a by the buoyant force produced by air current occurring on the surface of the rotating magnetic disk 10. A write head 15 formed of a thin-film magnetic layer for writing, and a read head 13 formed of a GMR element, are embedded in the head/slider 11 at a position close to a trailing edge surface 11b.

The head/slider 11 is equipped with a Peltier device 12 used to adjust the flying height of the write head 15 and that of the read head 13. A control method for controlling the flying height by use of a Peltier device is well-known as described in Japanese Patent Application Laid-Open No. 2003-297029. A write gap for generating a magnetic field used to magnetize a magnetic layer is formed on the write head 15, and a read gap for detecting the magnetic flux emitted from the magnetic layer is formed on the read head 13. The write gap and the read gap are exposed from the air bearing surface 11a of the head/slider 1. The write head 15 includes a coil 15a and a magnetic pole 15b. When a write current is fed into the coil 15a, a signal magnetic field is generated in the write gap that is equivalent to an edge of the magnetic pole 15b, and consequently the magnetic flux 17 is emitted. Then, the magnetic flux 17 passing through the magnetic layer magnetizes the magnetic layer by the specified length to form a magnetic domain. The magnetic disk drive changes a magnetization direction of the magnetic domain by changing a direction of the electric current to be fed into coil 15a. As a result, information is written to the magnetic disk 10.

The read head 13 includes an insulating layer, a shield layer, a GMR film, and a magnetic domain control layer. A bias current or a sense current is supplied to both ends of the GMR film from the outside through a pad of the head/slider 11. Because a value of resistance of the GMR film changes under the influence of the signal magnetic field emitted from the magnetic layer, the read head 13 can read out information written to the magnetic disk 10 by detecting a change in value of resistance as a change in voltage with respect to the bias current.

The magnetic disk 10 is formed by laminating a magnetic layer on a surface of a glass substrate, and then by applying a protective lubricating film to a surface of the magnetic layer. The surface of the glass substrate is leveled by a lapping process to even the thickness. The surface of the glass is further made flat by a mirror surface polishing process. However, because it is difficult to completely make the surface flat from the viewpoint of manufacturing costs and the production time, a few minute projections and a few minute concavities are left unprocessed. Therefore, a shape of the substrate is transferred also to the magnetic layer laminated on the substrate, and to the protective lubricating film, with the result that minute projections and minute concavities are formed. FIG. 1(A) illustrates a minute projection 19 and a minute concavity 20 that are formed on the recording surface 10a of the magnetic disk. Incidentally, in FIG. 1(A), a scale is not correctly described to make the description easier.

If the magnetic disk 10 is kept rotating in the arrow A direction, the minute projection 19 collides with the read head 13. The frictional heat thereof causes a value of resistance of the GMR film to change. As a result, a read signal level changes, causing TA. In addition, if a surface of the minute projection 19 comes off and then adheres to another part of the surface of the magnetic disk, there is also a possibility that it will grow up to become a new minute projection. When the write head 15 writes data to the minute concavity 20, there is a case where it is not possible to sufficiently magnetize the magnetic layer because the flying height is too high, and consequently the read head 13 cannot generate a sufficient signal magnetic field.

Figure 1B:
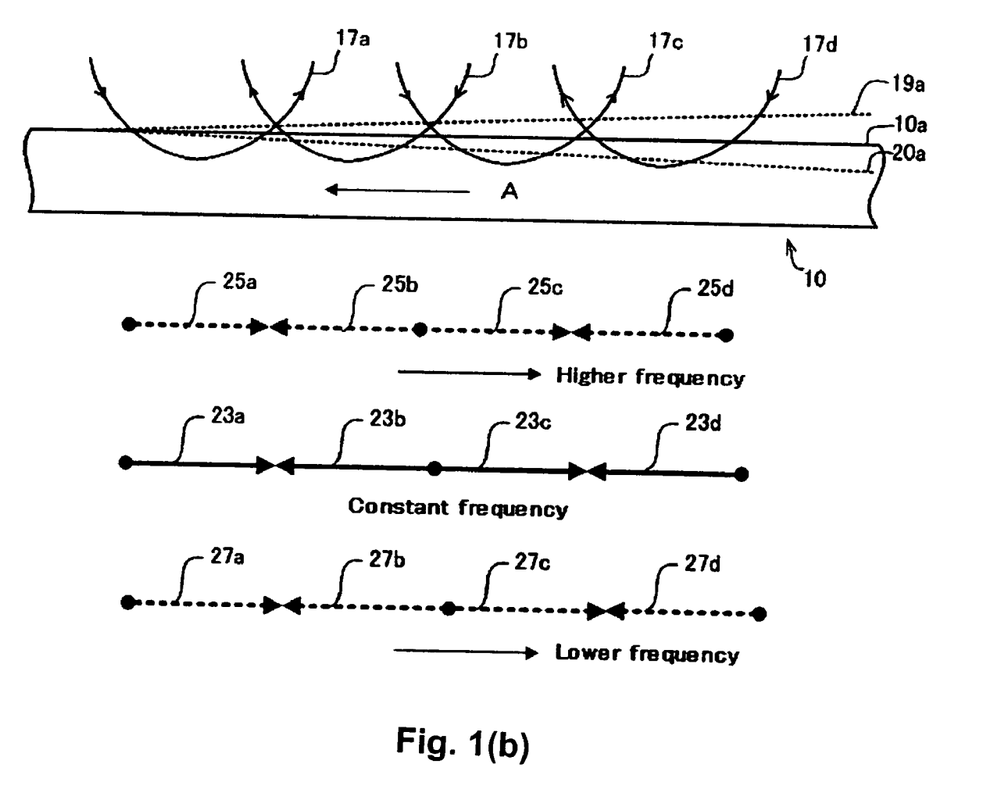

FIG. 1(B) is a diagram illustrating how a magnetic domain is formed when the write head 15 writes data to the minute projection 19 and the minute concavity 20. FIG. 1(B) is based on the assumptions that the magnetic disk 10 rotates at a constant rotational speed, and thereby the head/slider 11 flies with the flying height of the write head 15 being kept constant, and that a write current, which is generated by a write clock whose frequency is constant, flows through the write head 15. In addition, magnetic fluxes 17a, 17b, 17c, 17d each corresponding to a write current are emitted from a write gap. Each of the magnetic fluxes 17a through 17d corresponds to a consecutive signal of the write clock on a bit basis.

In FIG. 1(B), the rotation of the magnetic disk is stopped, and the write head 15 moves in a direction opposite to the arrow A at a rotational speed of the magnetic disk 10 so that the magnetic fluxes 17a through 17d show a position of information to be written to the magnetic disk. The magnetic fluxes 17a through 17d penetrate a magnetic layer laminated inside the recording surface 10a of the magnetic disk to magnetize the magnetic layer so that a magnetic domain is formed. A recording surface 19a indicates a position of an up grade of the minute projection 19; and a recording surface 20a indicates a position of a down grade of the minute concavity 20.

At a position of the projection 19, the magnetic layer and the protective lubricating film rise in response to a shape of the glass substrate, whereas at a position of the concavity 20, the magnetic layer and the protective lubricating film fall in response to the shape of the glass substrate. Because a frequency of the write clock is constant and the rotational speed of the magnetic disk 10 is also kept constant, the magnetic fluxes 17a through 17d are formed at regular intervals. The magnetic flux 17a forms a magnetic domain 23a in a direction indicated with an arrow in the magnetic layer. The magnetic flux 17b forms a magnetic domain 23b that is magnetized in a direction opposite to that of the magnetic domain 23a. The trailing end of the magnetic domain 23a formed earlier is overwritten by the leading end of the magnetic flux 17b that is written later. Because directions of both magnetic fields differ from each other, a position of magnetization reversal is formed at the boundary between both magnetic fields.

When viewing from the side, each of the magnetic fluxes 17a through 17d which are emitted from the write gap draws a closed curve. Accordingly, the leading end thereof becomes narrow. If the flying height which is a gap between the magnetic layer and the write head 15 is constant with respect to the recording surface 10a, the magnetic domains 23a through 23d are formed at regular intervals. In this example, because a selected pattern of the write clock is "1010" that is an alternately inverted pattern, a magnetization reversal position is defined at each boundary between the magnetic domains 23a through 23d. A frequency of a read signal clock (read clock) of the magnetic disk drive is defined by a magnetization reversal position of each magnetic domain. Therefore, when the read head 13 reads information of the magnetic domains 23a through 23d of the magnetic disk 10 rotating at a constant rotational speed, a frequency of a read signal becomes constant.

If the size of the minute projection 19 and that of the minute concavity 20 are sufficiently small as compared with the size of the head/slider 11, even if the minute projection 19 or the minute concavity 20 reaches a position under the air bearing surface 11a, this does not result in a change in position in the height direction of the write head 15. Therefore, the flying height at a position at which the write head 15 makes a write to the recording surface 19a corresponding to the up grade of the minute projection 19 becomes lower than the flying height at a position of the recording surface 10a. Accordingly, because a position at which the magnetic fluxes 17a through 17d pass through the magnetic layer becomes deeper than a position corresponding to the magnetic layer of the recording surface 10a, the magnetic domains 25a through 25d which are shorter than the magnetic domains 23a through 23d are formed. The magnetic domains 25a through 25d become shorter with the increase in height of a position of the recording surface 19a relative to the recording surface 10a (in the figure, as the head/slider 11 moves in a direction opposite to the arrow A).

On the other hand, the flying height at a position at which the write head 15 makes a write to the recording surface 20a corresponding to the down grade of the minute concavity 20 becomes higher than the flying height at a position of the recording surface 10a. Accordingly, because a position at which the magnetic fluxes 17a through 17d pass through the magnetic layer becomes shallower than a position corresponding to the magnetic layer of the recording surface 10a, the magnetic domains 27a through 27d which are longer than the magnetic domains 23a through 23d are formed. The magnetic domains 27a through 27d become longer with the decrease in height of a position of the recording surface 20a relative to the recording surface 10a (in the figure, as the head/slider 11 moves in the direction opposite to the arrow A).

A phase of a read signal at the time when the read head 13 reads out information of the magnetic domains 25a through 25d of the magnetic disk 10 rotating at a constant rotational speed progresses relative to a read signal of the magnetic domains 23a through 23d. In addition to it, the phase progresses to a larger extent with the increase in height of a position of the recording surface 19a relative to the recording surface 10a. There is the complete time integration relationship of the phase to the frequency, whereas there is the time differentiation relationship of the frequency to the phase. Therefore, on a minute projection, a frequency of a read signal increases with the increase in height of the minute projection relative to a flat area.

A phase of a read signal at the time when the read head 13 reads out information of the magnetic domains 27a through 27d of the magnetic disk 10 rotating at a constant rotational speed delays relative to a read signal of the magnetic domains 23a through 23d. In addition to it, the phase delays to a larger extent with the decrease in height of a position of the recording surface 20a relative to the recording surface 10a. In other words, a frequency of the read clock becomes lower with the decrease in height of a position of the recording surface 20a relative to the recording surface 10a. This feature is used in the present invention. To be more specific, a phase or frequency of the read signal is consecutively measured to compare the measured phase or frequency with a reference signal. Then, the height of the minute projection 19 or the depth of the minute concavity 20 is detected by use of a deviation value of the phase or a deviation value of the frequency. In addition, the circumferential length of the minute projection 19 or that of the minute concavity 20 is detected by use of a period of time during which a deviation in one direction continues.

Figure 2:
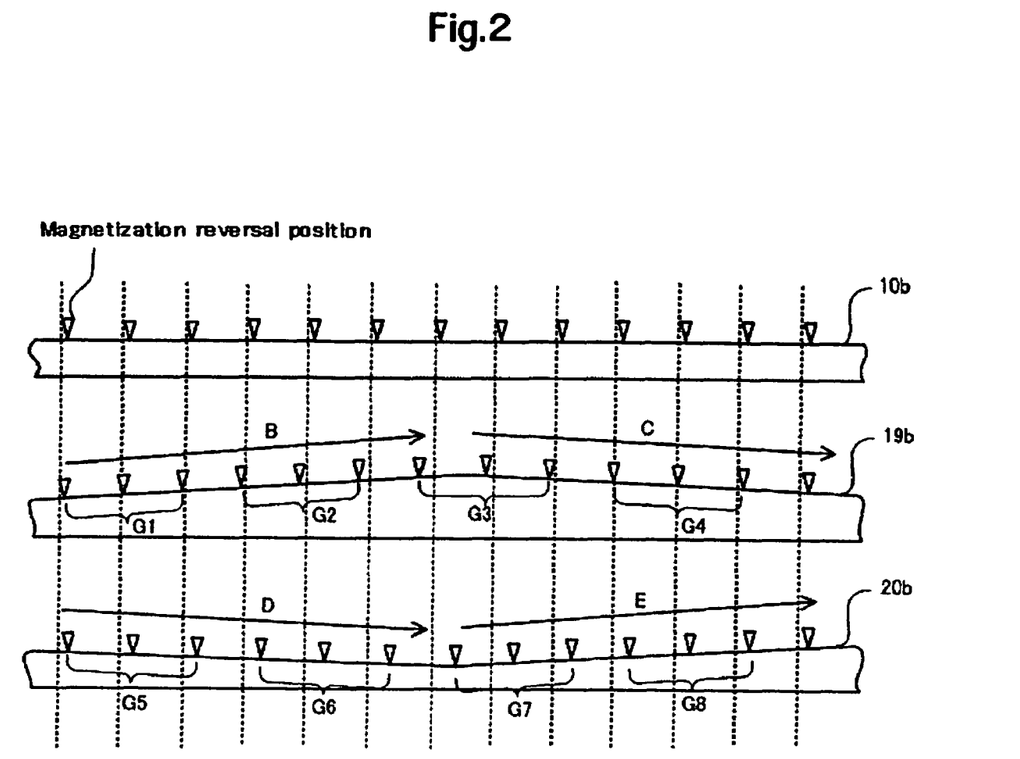
FIG. 2 is a diagram illustrating the result of simulating magnetization reversal positions on a minute projection and on a minute concavity.

FIG. 2 is a diagram illustrating the result of determining by means of simulation a magnetization reversal position of each magnetic domain on a minute projection and on a minute concavity. In FIG. 2, each magnetization reversal position on the flat recording surface 10b, on the recording surface 19b of the minute projection 19, and on the recording surface 20b of the minute concavity 20 is indicated with a Δ mark. As conditions of writing data, and conditions of defining a magnetization reversal position, for the recording surfaces 10b, 19b, 20b, the rotational speed of the magnetic disk is kept constant, and the same flying height of the head/slider and the same frequency of the write clock are set. In FIG. 2, the relationship between a magnetization reversal position of the recording surface 10b and that of the recording surfaces 19b, 20b means that magnetization reversal positions become those provided on the recording surface 10b on the assumptions that a recording surface at a position adjacent to the minute projection 19 or the minute concavity 20 in the circumferential direction is flat, and that the flat recording surface extends up to a position of the minute projection 19 or that of the minute concavity 20.

All magnetization reversal positions on the flat recording surface 10b are formed at regular intervals. A phase of a magnetization reversal position on the recording surface 19b of the minute projection progresses as a whole as compared with that on the flat recording surface 10b. In the up grade indicated with an arrow B, the extent to which the phase progresses becomes larger with the increase in height, whereas in the down grade indicated with an arrow C, the extent to which the phase progresses becomes smaller with the decrease in height. A phase of a magnetization reversal position on the recording surface 20a of the minute concavity is delayed as a whole as compared with that on the flat recording surface 10a. In the down grade indicated with an arrow D, the extent to which the phase is delayed becomes larger with the decrease in height, whereas in the up grade indicated with an arrow E, the extent to which the phase is delayed becomes smaller with the increase in height.

In FIG. 2, read clocks are grouped into groups G1 through G4 and groups G5 through G8, each of which is constituted of three consecutive clocks in order of the occurrence, to form clock groups. Then, an average value of frequencies of the read clocks, which are included in each clock group, is calculated. Instead of using the average value, a median or another representing value can also be used. The number of clocks which form a clock group can be properly selected. In addition, the average frequency of a read clock read from the flat recording surface 10b is set as a reference frequency. Because it can be thought that large part of each recording surface of the magnetic disk is a flat surface, an average value of frequencies of read signals read from a plurality of data sectors can be set as a reference frequency. The reference frequency can also be set as a frequency of a write clock. In this case, if the magnetic disk drive adopts a zone-bit recording method, a write clock is set for each zone that is set in the radial direction. Accordingly, a reference frequency is set on a zone basis.

Here, the average frequency of each clock group is compared with a reference frequency to calculate a deviation value of a frequency, and thereby the existence and size of the minute projection 19 or those of the minute concavity 20 are detected. If additional information including CRC or ECC is added to user data having a length of 512 bytes, information having a length of about 700 bytes (5600 bits) per piece is written to a data sector. If a clock group is constituted of ten read clocks, it becomes possible to identify the minute projection 19 or the minute concavity 20 with a resolution of 1/560 for the length of one data sector.

Figure 3A:
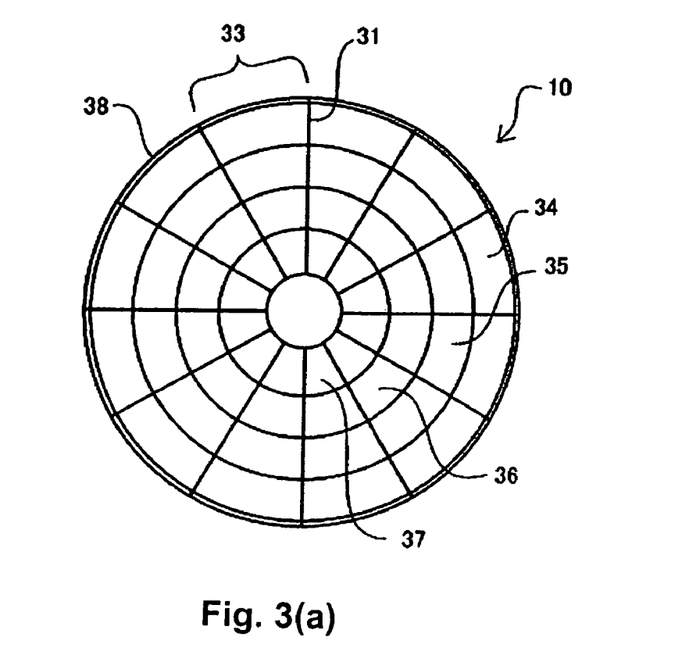
FIGS. 3(A), 3(B) are diagrams each illustrating how a format of a magnetic disk is configured.
Figure 3B:
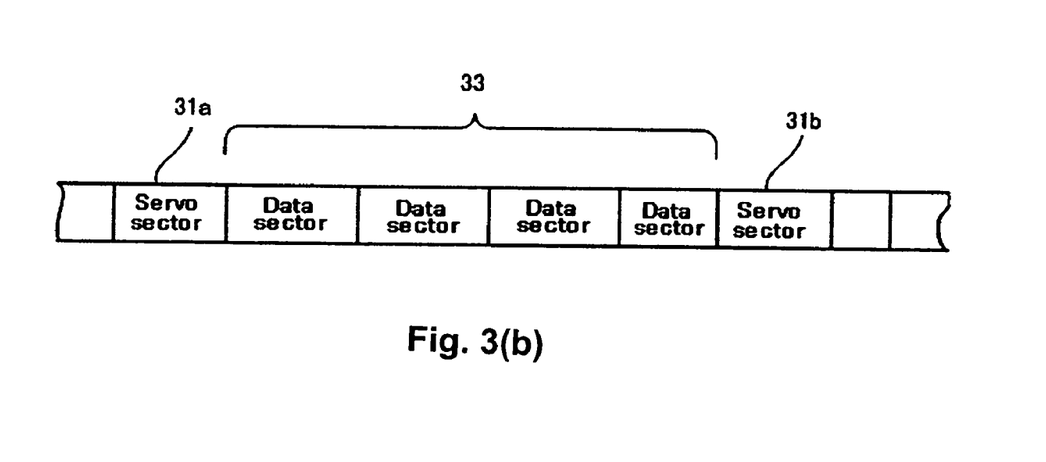

FIGS. 3(A), 3(B) are diagrams each illustrating how a format of the magnetic disk 10 is configured. The magnetic disk 10 has a format structure that is applied to magnetic disk drives adopting the data-surface servo system. As shown in FIG. 3(A), a plurality of servo sectors 31 which radially extend in the radial direction are written to the magnetic disk 10. As shown in FIG. 3(B), a data area 33 is formed between servo sectors 31a, 31b; and a plurality of data sectors are defined in the data area 33. The other servo sectors and the other data areas are also formed substantially in the same manner.

As a magnetic head nears the outer circumferential side, the speed of the data track which pass through the magnetic head becomes faster. In order to equalize the number of recorded bits per unit length on the outer circumferential side to that on the inner circumferential side as much as possible so that the storage capacity is increased, the magnetic disk 10 is partitioned into four zones 34 through 37 in the radial direction. In each zone, information of data sectors is written to the data area 33 with a write clock having the same frequency. However, in a zone that is closer to the outer circumferential side, a frequency of the write clock is made higher so that the number of data sectors increases. This method is called a zone-bit recording method. In the vicinity of the outermost circumferential track of the magnetic disk 10, a system area 38, which is dedicated to the system's use without allowing users to use it, is defined.

Figure 4:
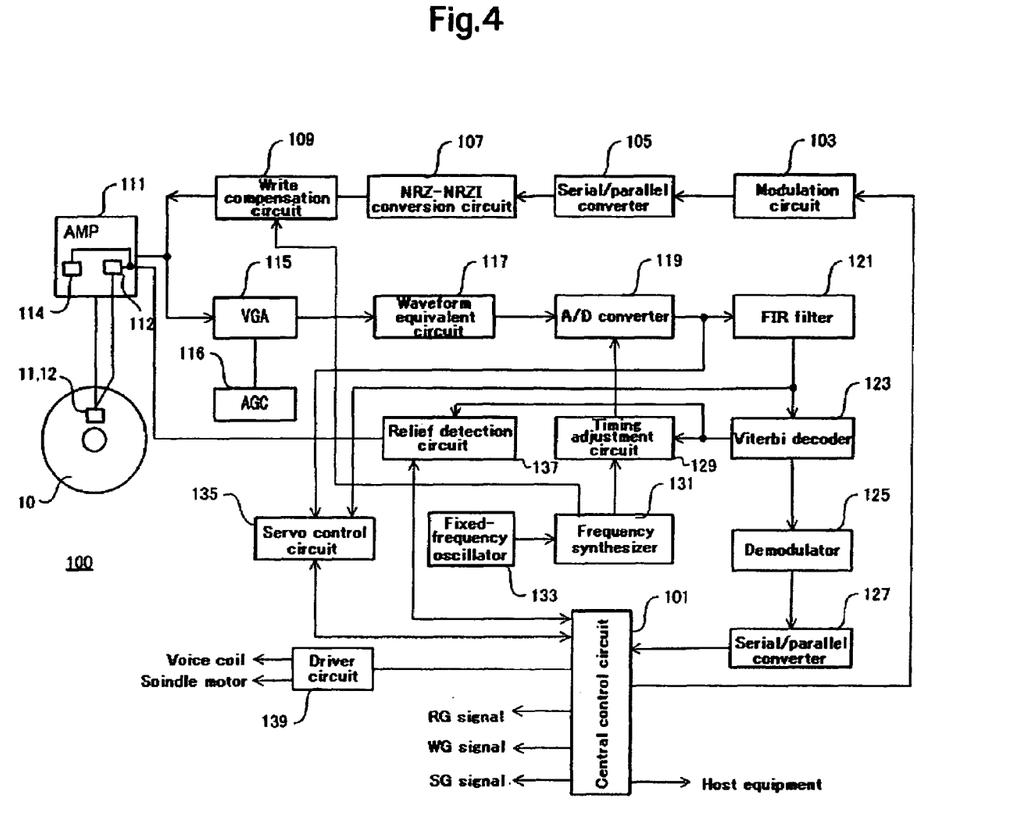
FIG. 4 is a schematic block diagram of a magnetic disk drive.

A configuration of a magnetic disk drive 100 according to an embodiment of the present invention will be schematically described with reference to FIG. 4. In the description in FIG. 4, known elements of the magnetic disk drive are simplified or omitted. A central control circuit 101 includes a processor and a memory. The central control circuit 101 totally controls the magnetic disk drive 100 to perform data communications with host equipment, and to write/read data to/from the magnetic disk 10. The central control circuit 101 generates a servo gate pulse (SG pulse), a read gate pulse (RG pulse), and a write gate pulse (WG pulse). The central control circuit 101 transmits the pulses to a read/write channel, a servo control circuit 135, and the like. The SG pulse, the RG pulse, and the WG pulse are signals used to determine the timing of read or write operation for a servo sector for reading operation, for a data sector for reading, and for a data sector for writing respectively.

A modulation circuit 103 converts user data transmitted from the central control circuit 101 into a RLL (Run Length Limited) code that is suitable for writing to a recording medium. A parallel/serial converter 105 serial-parallel converts the RLL code transmitted from the modulation circuit 103. An NRZ-NRZI conversion circuit 107 converts a signal of the NRZ method, which is based on a user data format, into a signal of the NRZI (Non-Return to Zero Inverse) method that is suitable for writing to a magnetic disk. A write compensation circuit 109 is a circuit for shifting the timing of feeding a write current so as to compensate NLTS (Non Linear Transition Shift) that is equivalent to the deviation time of a magnetization reversal position. The write compensation circuit 109 transmits, to a write driver of a head amplifier 111, a write current used to write user data in the timing of a write clock received from a frequency synthesizer 131.

The head/slider 11 is equipped with the Peltier device 12 used for heating and cooling. The Peltier device is a well-known device that adjusts the flying height by changing the temperature of the write head 15 and that of the read head 13 to use the thermal expansion thereof. In addition, as a heating element for adjusting the flying height, an electrical heater as described in Japanese Patent Application Laid-Open No. 2003-168274 can also be adopted.

The head amplifier 111 feeds a write current to the write head 15 (shown in FIG. 1) so that a data sector is written. The head amplifier 111 further includes a read amplifier for amplifying a signal read by the read head 13 (shown in FIG. 1). The head amplifier 111 includes a Peltier-device control circuit 112 that changes the polarity of DC voltage to be applied to the Peltier device 12 formed in the head/slider 11 so that cooling or heating effect is produced. The head amplifier 111 includes a write current control circuit 114 for controlling the amount of a write current in response to the flying height. Hereinafter, the modulation circuit 103, the parallel/serial converter 105, the NRZ-NRZI conversion circuit 107, the write compensation circuit 109, and the head amplifier 111 are called a write channel. The write head 15 generates, in a data sector, a magnetic field used to write user data, an error correction code (ECC) which is added to the user data, an error detection code (CRC), a preamble, and the like.

The read head 13 is used to read a servo sector and a data sector. A variable gain amplifier 115 and an automatic gain controller 116 keep constant the amplitude of a read signal of user data, and that of servo data, which have been received from the head amplifier 111. A waveform equivalent circuit 117 includes a low-pass filter capable of programmably changing a high-band gain, and thereby the waveform equivalent circuit 117 can eliminate noises included in a read signal to achieve equivalence of a waveform. The equivalence means signal processing of adjusting to a PR (Partial Response) class based on a waveform of a read signal. An A/D converter 119 includes a differentiation circuit, a filter, and a comparator. The A/D converter 119 generates a digital read signal from an analog read signal. By a read clock supplied from a timing adjustment circuit 129, the A/D converter 119 acquires the timing in which a digital read signal is generated.

A FIR (Finite Impulse Response) filter 121 is a digital filter that includes a plurality of serially-connected delay operators. The FIR filter sets a tap value to generate a signal that is easy to decode. A Viterbi decoder 123 uses a PRML (Partial Response Maximum Likelihood) circuit to handle a signal handled by the FIR filter 121, and then outputs the signal as a RLL code. A demodulator 125 converts the RLL code into data of a NRZ code string in a user data format. A serial/parallel converter 127 converts the NRZ code string into parallel data, and then transmits the parallel data to the central control circuit 101.

Hereinafter, the head amplifier 111, the variable gain amplifier 115, the automatic gain controller 116, the waveform equivalent circuit 117, the A/D converter 119, the FIR filter 121, the Viterbi decoder 123, the demodulator 125, and the serial/parallel converter 127 are called a read channel. In addition, a channel in which the write channel and the read channel are combined is defined as a read/write channel. The read/write channel operates in response to the RG pulse and the WG pulse that are generated by the central control circuit 101.

The timing adjustment circuit 129 includes a phase locked loop (PLL) oscillator circuit. The timing adjustment circuit 129 synchronizes an output signal of the Viterbi decoder 123 with a data clock supplied from the frequency synthesizer 131 so as to generate a read clock. The timing adjustment circuit 129 supplies the read clock to the A/D converter 119, and other digital circuits of the read channel, and thereby controls the timing in which the A/D converter 119 digitizes an analog signal generated when user data written to the data area 33 is read out.

The servo control circuit 135 operates in response to a SG pulse supplied from the central control circuit 101. The servo control circuit 135 reads out a burst pattern of servo data received from the A/D converter 119, and then transmits the burst pattern to the central control circuit 101. In addition, the servo control circuit 135 supplies a timing signal to the central control circuit 101 so that an address mark of the servo data received from the FIR filter 117 is read out to generate a SG pulse, a RG pulse, and a WG pulse. The driver circuit 139 includes a driver for generating an electric current to be supplied to a spindle motor and a voice coil. The driver circuit 139 supplies, to the spindle motor and the voice coil, an electric current in response to a digital control signal received from the central control circuit 101.

The frequency synthesizer 131 includes a phase comparator, a low-pass filter, a voltage-controlled oscillator (VCO), and a divider. The frequency synthesizer 131 outputs, to the timing adjustment circuit 129 and the write compensation circuit 109, each data clock having a frequency corresponding to each of the zones 34 through 37 according to a control signal received from the central control circuit 101. A fixed-frequency oscillator 133 includes a crystal oscillator, and supplies a single frequency to the frequency synthesizer 131.

Figure 5:
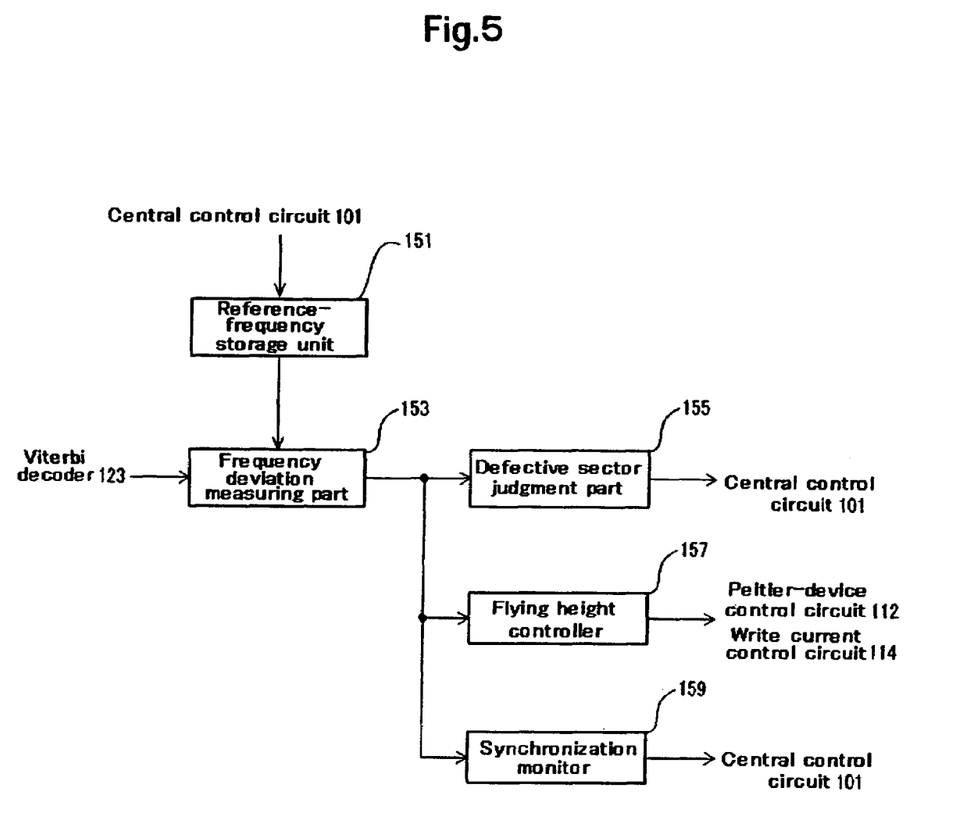
FIG. 5 is a schematic block diagram of a relief detection circuit.

As shown in FIG. 5, a relief detection circuit 137 includes a reference-frequency storage unit 151, a frequency deviation measuring part 153, a defective sector judgment part 155, a flying height controller 157, and a synchronization monitor 159. The reference-frequency storage unit 151 is a memory for storing a reference frequency used to measure a deviation of frequency. The reference-frequency storage unit 151 stores each average frequency of read clocks read from a plurality of data sectors that are selected on a zone basis. The reference-frequency storage unit 151 may also be configured to store a frequency of each write clock that is set for each of the zones 34 through 37 on the magnetic disk 10. The reference frequency is generated by the central control circuit 101, and is transmitted to the reference-frequency storage unit 151.

The frequency deviation measuring part 153 measures a frequency of a read signal transmitted from the Viterbi decoder 123, and then calculates the average frequency for each pulse group constituted of about 10 pulses. After that, the frequency deviation measuring part 153 compares the reference frequency with the average frequency to calculate a deviation value of a frequency. While the magnetic disk drive 100 operates in a read mode, the defective sector judgment part 155 receives the deviation value of the frequency from the frequency deviation measuring part 153. At a point of time at which the deviation value of the frequency exceeds a specified threshold value, a data sector in which the pulse group has been detected is judged by the defective sector judgment part 155 to be a defective sector because there is a projection or a concavity therein. The defective sector judgment part 155 then notifies the central control circuit 101 of the defective sector.

The flying height controller 157 receives the deviation value of the frequency from the frequency deviation measuring part 153, and then transmits a control signal to the Peltier-device control circuit 112 so that the flying height is changed in response to the deviation value. To be more specific, if a frequency of a pulse group increases, causing the deviation value to shift to the plus direction, the flying height controller 157 transmits to the Peltier-device control circuit 112 such a control signal that the Peltier device 12 produces a cooling effect. In this case, the control signal transmitted from the flying height controller 157 produces a larger cooling effect with the increase in deviation value. On the other hand, if the frequency of the pulse group decreases, causing the deviation value to shift to the minus direction, the flying height controller 157 transmits to the Peltier-device control circuit 112 such a control signal that the Peltier device 12 produces a heating effect. In this case, the control signal transmitted from the flying height controller 157 produces a larger heating effect with the increase in deviation value of the pulse group. The flying height controller 157 transmits a control signal to the write current control circuit 114 so that a write current can be controlled in response to the existence of a micro-relief.

While the magnetic disk drive 100 performs read operation, the synchronization monitor 159 receives the deviation value of the frequency from the frequency deviation measuring part 153, and then monitors a synchronization state of the timing adjustment circuit 129. If the deviation of the frequency of the read signal relative to the reference frequency becomes larger, the timing adjustment circuit 129 cannot generate a read clock that is synchronized with a read signal, resulting in an unsynchronized state. Therefore, when the deviation value exceeds a specified value, a signal for stopping the read operation is transmitted to the central control circuit 101.

How to register a defective sector in the magnetic disk drive 100 before shipment will next be described, wherein a micro-relief on a surface of a magnetic disk is detected to measure a deviation value of a frequency of a read signal. There is a possibility that a micro-relief will grow up after shipment, and consequently will cause TA. If TA occurs in a data sector to which user data is written, it is not possible to read the user data. Accordingly, if the size of a micro-relief exceeds a certain level, it is desirable to identify the data sector as a defective sector even before TA may occur, and to perform defect registration of the defective sector. Here, the size of the micro-relief can be determined in consideration of the height and the length in the circumferential direction.

The defect registration of a data sector to be performed before shipment can be performed by means of a well-known write/read test with the exception of a judgment method of a defective sector. A program for performing the defect registration is stored in a system area 38 on the magnetic disk 10. The program is executed by the central control circuit 101. During the write/read test, test data is first written to all data sectors, and subsequently the test data is read in order. At this time, conditions in which a read error is apt to occur are set by reducing the number of ECC symbols, or by stopping a function of error recovery procedure (ERP). The central control circuit 101 reads the test data from the same data sector a plurality of times, and judges a data sector in which the number of times a read error has occurred exceeds a specified value to be a defective sector, and then registers the defective sector in a primary defect map (PDM).

As far as the conventional write/read tests are concerned, even if the minute projection 19 and the minute concavity 20 exist on a surface of the magnetic disk, the data sector is not judged as a defective sector so long as test data can be read out. In this embodiment, while the read channel performs read operation (while a read clock is kept in synchronization with a read clock), the frequency deviation measuring part 153 of the relief detection circuit 137 measures a deviation value of the average frequency of a pulse group, which is set in a read signal, relative to the reference frequency, and then transmits the deviation value to the defective sector judgment part 155. If the deviation value exceeds a specified value, the defective sector judgment part 155 identifies the data sector in question as a defective sector, and then notifies the central control circuit 101 of an absolute block address (ABA) of the data sector.

Figure 6A:
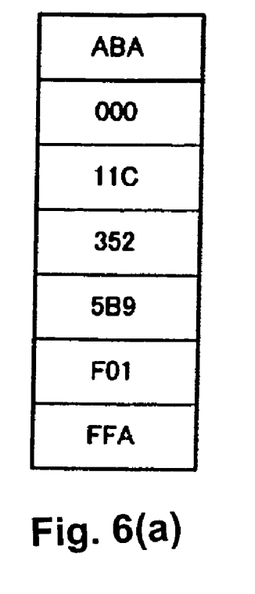
FIGS. 6(A), 6(B), 6(C) are diagrams illustrating as an example PDM, RDM, and a control table respectively.

Even if a read error does not occur, the central control circuit 101 identifies as a defective sector the data sector whose ABA has been received, and then registers the defective sector in a PDM as shown in FIG. 6(A). In FIG. 6(A), ABAs of six data sectors are stored. The central control circuit 101 assigns in order a logical block address (LBA) to each of data sectors, which are aligned in order of physical locations, with each data sector whose address is registered in the PDM being skipped. As a result, in a stage before shipment, LBAs are aligned in order of rotation of the magnetic disk, and in order of seek operation. Accordingly, when the host equipment specifies LBAs whose number are consecutive to write or read data, the magnetic disk drive 100 is adapted not to have the rotational latency and the seek time more than necessary.

In this embodiment, even if the read head 13 does not contact a minute projection, the minute projection 19 can be detected. Accordingly, it is possible to further increase the reliability of write data. In addition, the minute concavity 20 is also identified as a defective sector in response to the size of the minute concavity 20 in like manner. The defective sector is then registered in the PDM. Although the minute concavity 20 will not cause TA, the flying height of the write head 15 and the read head 13 becomes high at a position at which the minute concavity 20 is present, and accordingly a degree of magnetic coupling with the magnetic layer decreases. Therefore, it is desirable from the viewpoint of an improvement in reliability that a data sector which includes the minute concavity 20 whose size is greater than or equal to a specified value be identified as a defective sector.

The PDM is stored in the system area 38 on the magnetic disk 10. When the power is supplied to the magnetic disk, the PDM is read out into the central control circuit 101. In addition, addresses of data sectors whose defect registration should be performed include not only an address of a data sector that is identified as a defective sector on the basis of the result of measuring a deviation value of a frequency, but also addresses of data sectors located in the vicinity of the defective sector in question. Moreover, also when TA has actually occurred, a deviation value of the frequency of the read signal relative to the frequency of the reference signal becomes large. Accordingly, also when the magnetic head contacts the magnetic disk, it is possible to register a defective sector in the method according to this embodiment. Incidentally, an address of a sector whose defect registration has been performed as a result of an aspect other than the deviation value of the frequency, such as a defect of the magnetic layer, is also registered in the PDM.

How to register a defective sector will next be described in the magnetic disk drive 100 that has been shipped from a factory and is used by a user, wherein a deviation value of a frequency is measured to detect a micro-relief on a surface of a magnetic disk. In general, when user data written to the magnetic disk 10 cannot be normally read, the magnetic disk drive 100 executes ECC and ERP to recover from an error. However, if the error cannot be recovered, or if the error is critical, the magnetic disk drive 100 identifies the data sector in question as a defective sector, and then registers a LBA of the data sector in the reassign defect map (RDM).

In the case of the conventional magnetic disk drives, even if the minute projection 19 exists, defect registration of the data sector in question is not performed unless TA occurs. Therefore, if a minute projection existing in a data sector to which user data is written grows up and thereby TA is caused, it may be impossible to read the user data. In this embodiment, while the read channel performs the read operation, the frequency deviation measuring part 153 of the relief detection circuit 137 measures a deviation value of the average frequency of a pulse group, which is set in a read signal, relative to the reference frequency, and then transmits the deviation value to the defective sector judgment part 155. If the deviation value of the frequency exceeds a specified value, the defective sector judgment part 155 identifies the data sector in question as a defective sector, and then notifies the central control circuit 101 of a LBA of the data sector in question.

Figure 6B:
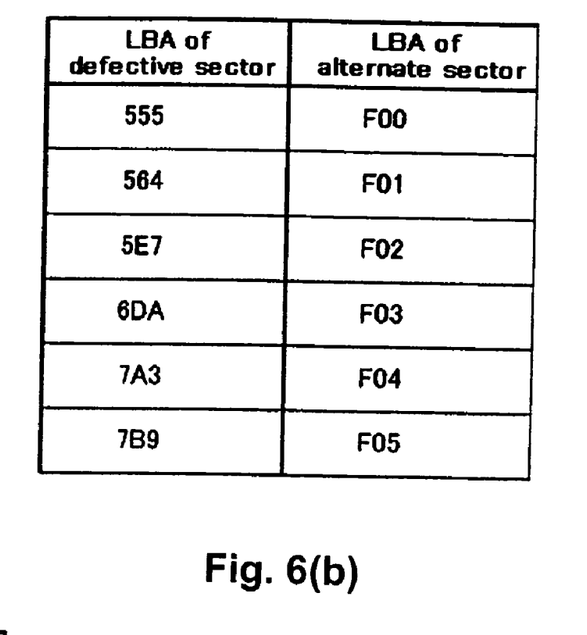

Even if the data sector whose LBA has been received from the defective sector judgment part 155 is a data sector from which data can be read by executing ERP, the central control circuit 101 identifies the data sector in question as a defective sector, and then registers this data sector in a RDM as shown in FIG. 6(B). The RDM is a mapping table used to associate each defective sector with an alternate sector. In FIG. 6(B), a sector to be replaced is assigned to each of six defective sectors. When a write command to write user data to a data sector registered in the RDM is transmitted from the host equipment, the central control circuit 101 writes the user data to the sector replaced with reference to the RDM. In addition, when a read command to read user data from a data sector registered in the RDM is transmitted, the central control circuit 101 reads out the user data from the replaced sector.

In this embodiment, a data sector containing a minute projection whose possibility of causing TA is high is registered before TA may occur so as to disallow the use of the data sector. Therefore, it is possible to further increase the reliability of write data. The RDM is stored in the system area 38 of the magnetic disk 10. When the power is supplied to the magnetic disk drive 100, the RDM is read out into the central control circuit 101. Then, when a write command or a read command is executed, the processor refers to the RDM. Incidentally, as is the case with the PDM, an address of a sector whose defect registration has been performed as a result of an aspect other than the deviation value of the frequency, such as a defect of the magnetic layer, is also registered in the RDM.

Next, a method for controlling the flying height by measuring a deviation value of a frequency of a read signal will be described. The Peltier-device control circuit 112 controls the polarity and amount of DC voltage to be applied to the Peltier device 12 so that a cooling effect or a heating effect can be produced. When user data is read, the flying height controller 157 generates a control signal on the basis of a deviation value of the average frequency of a pulse group relative to the reference frequency, the deviation value being measured by the frequency deviation measuring part 153. In the case of a minute projection, the control signal controls the Peltier device 12 so that a cooling effect is produced. On the other hand, in the case of a minute concavity, the control signal controls the Peltier device 12 so that a heating effect is produced.

In addition, the deviation value can typify, by use of an absolute value thereof, the height of the minute projection and the depth of the minute concavity. Therefore, the control signal can adjust the amount of the cooling effect or that of the heating effect in response to the absolute value of the deviation value. As a result, when the read head 13 passes over a minute projection, cooling is performed so that the flying height becomes higher, whereas when the read head 13 passes over a minute concavity, heating is performed so that the flying height becomes lower. This is how to control the flying height. By adjusting the extent of cooling or heating by the Peltier device 12, the flying height is controlled so that even at a position on a surface at which a minute projection or a minute concavity exists, a value of the flying height becomes closer to that at a position on a flat surface. As a result, in the case of a minute concavity, it is possible to keep a degree of magnetic coupling constant, and thereby to achieve stable magnetization. In the case of a minute projection, it becomes possible to avoid a situation in which TA unexpectedly occurs.

Figure 6C:
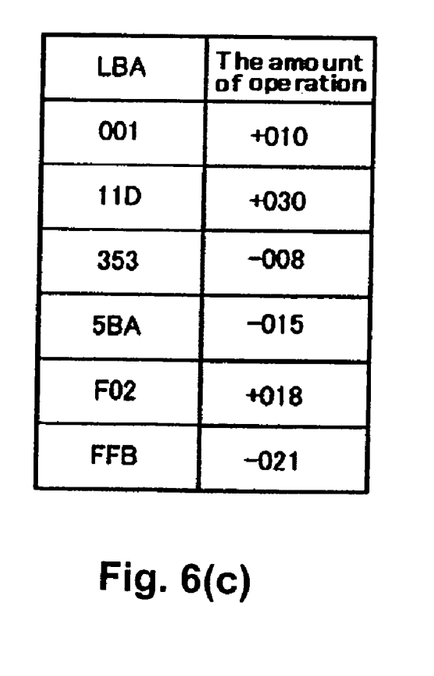

As described above, the flying height may be controlled with a deviation value of a frequency being monitored during the read operation. However, the flying height may also be controlled by registering a LBA of a data sector whose deviation value of a frequency exceeds a specified value, and the amount of operation of the flying height, in a control table as shown in FIG. 6(C), and by referring to the control table by the central control circuit 101. If a LBA of a data sector at which the flying height is controlled is known, conditions of the response speed of a flying-height control mechanism is eased, which is advantageous. The control table shown in FIG. 6(C) stores LBAs of six data sectors whose deviation value of a frequency exceeds a specified value, and the amount of operation corresponding to each of the LBAs. For a sign of the amount of operation, a plus sign indicates a minute projection, whereas a minus sign indicates a minute concavity. In addition, an absolute value of the amount of operation indicates the amount of adjustment of the flying height.

A method for controlling the flying height includes not only a method that uses a Peltier device and a heater but also such a method that the posture of a head/slider and the posture of a suspension are mechanically changed by a piezoelectric element. Incidentally, the control table can also be used as the RDM. In this case, a flag used to distinguish a defective sector which has been detected on the basis of a deviation value of a frequency from defective sectors which have been registered as a result of the other causes is set and registered in the RDM together with the amount of operation.

As another embodiment in which the detection of a microrelief based on a deviation value of a frequency is used, there is the control of a write current. The head amplifier 111 is provided with the write current control circuit 114 for controlling the amount of write current to be supplied to the write head 15. When the flying height controller 157 identifies the existence of a minute concavity on the basis of the deviation value of the frequency received from the frequency deviation measuring part 153, instead of transmitting to the Peltier-device control circuit 112 a control signal for changing the flying height, or concurrently with this, a control signal for increasing a write current is transmitted to the write current control circuit 114. As a result of it, the temperature of the write head 13 increases, which causes the flying height to decrease, and causes a write current to become large. Accordingly, it is also possible to reliably magnetize a magnetic domain of the minute concavity.

As another embodiment in which a deviation value of a frequency is measured, there is the control of read operation. There is a case where a deviation value of a frequency of a read signal relative to the reference frequency becomes larger during read operation, and eventually exceeds a range in which the timing adjustment circuit 129 is kept synchronized. If the timing adjustment circuit 129 cannot generate a read clock that is synchronized with a read signal, the synchronization cannot be achieved. As a result, an error continuously occurs in a read signal at the time of reading a data sector until the synchronization is recovered.

If an error concurrently occurs in the data sector, the magnetic disk drive cannot recover from the error, or it takes a long time to recover from the error. Therefore, it is necessary to avoid this. In a process in which a state of a PLL of the timing adjustment circuit 129 changes from a synchronized state to an unsynchronized state, a frequency of a read signal gradually goes away from a free-running frequency of VCO. In this embodiment, during read operation, the frequency deviation measuring part 153 detects a deviation value of a frequency, and then transmits the deviation value to the synchronization monitor 159. The synchronization monitor 159 continuously monitors a deviation value of a frequency. When the deviation value becomes larger, which results in a nearly unsynchronized state, the synchronization monitor 159 transmits to the central control circuit 101 a signal for stopping the read operation. The central control circuit 101, which has received the signal, stops the read operation of the read channel.

Up to this point, the present invention was described on the basis of the specific embodiments shown in the diagrams. The present invention, however, is not limited to the embodiments illustrated in the diagrams. It is needless to say that so long as the effects of the present invention are produced, any configuration which is known in the past can also be adopted.

What is claimed is:

1. A method for registering a defective sector of a magnetic disk in a magnetic disk drive, said method comprising the steps of:
   providing a reference signal;
   writing each data sector to the magnetic disk;
   reading said each data sector to generate a read signal;
   comparing the read signal with the reference signal to measure a deviation value of both or either of a frequency and a phase; and
   registering an address of a data sector, of which the measured deviation value is greater than or equal to a specified value, in an address table.

2. The method for registering a defective sector according to claim 1, wherein:
   said address is an absolute block address, and said address table is a primary defect map (PDM).

3. The method for registering a defective sector according to claim 1, wherein:
   said address is a logical block address, and said address table is a reassign defect map (RDM).

4. The method for registering a defective sector according to claim 1, wherein:
   said address table is a control table used to control the flying height for a data sector whose address is registered.

5. The method for registering a defective sector according to claim 1, wherein:
   while the deviation value is measured, a read clock used to generate the read signal is kept in synchronization with the read signal.

6. The method for registering a defective sector according to claim 1, wherein:
   said step of measuring the deviation value includes a step of grouping a plurality of clocks of the read signal in order of the occurrence, and then comparing a read signal typifying the group with the reference signal.

7. A magnetic disk drive comprising:
   a magnetic disk on which each data sector is written;
   a read head for detecting a magnetic signal written to the magnetic disk;
   a read channel for generating a read signal from the magnetic signal detected by the read head;
   a timing adjustment circuit for supplying, to the read channel, a read clock that is synchronized with the read signal; and
   a relief detection circuit for, while the read clock is kept in synchronization with the read signal, comparing the read signal with a reference frequency stored in a reference frequency storage unit, to measure a deviation value of both or either of a frequency and a phase.

8. The magnetic disk drive according to claim 7, further comprising a flying-height control mechanism that receives a deviation value from the relief detection circuit and then operates.

9. The magnetic disk drive according to claim 8, wherein:
   if a frequency of the read signal is higher than the reference frequency, said flying-height control mechanism operates in a direction in which the flying height is increased.

10. The magnetic disk drive according to claim 8, wherein:
    if a frequency of the read signal is lower than the reference frequency, said flying-height control mechanism operates in a direction in which the flying height is decreased.

11. The magnetic disk drive according to claim 7, wherein:
    if the deviation value exceeds a specified value, said read channel stops read operation.

12. The magnetic disk drive according to claim 7, further comprising a write-current control mechanism for controlling the amount of a write current in response to the deviation value.

13. The magnetic disk drive according to claim 7, further comprising an address table in which an address of a data sector whose deviation value exceeds a specified value is registered.

14. The magnetic disk drive according to claim 13, further comprising a flying-height control mechanism for controlling the flying height for a data sector registered in the address table.

15. The magnetic disk drive according to claim 7, wherein:
    when the read head is not in contact with the magnetic disk, said read signal is generated.

16. The magnetic disk drive according to claim 7, wherein:
    the reference frequency is a representing value of read signals read from a plurality of data sectors.

17. The magnetic disk drive according to claim 7, wherein:
    said magnetic disk drive adopts a perpendicular magnetic recording system.

18. The magnetic disk drive according to claim 7, wherein:
    said read head includes a MR element or a GMR element.

19. A method for controlling the flying height in a magnetic disk drive, said method comprising the steps of:
    writing each data sector to the magnetic disk;
    reading said each data sector to generate a read signal;
    comparing the read signal with a reference signal to measure a deviation value of both or either of a frequency and a phase; and
    controlling the flying height for a data sector in which a deviation value which is greater than or equal to a specified value has been detected.

20. The method for controlling the flying height according to claim 19, said method further comprising the step of
    registering, in an address table, a data sector in which a deviation value which is greater than or equal to a specified value has been detected,
    wherein:
    said step of controlling the flying height includes a step of controlling the flying height on the basis of an address registered in the address table.

* * * * *